US 11,833,716 B2

United States Patent
Z'rotz et al.

(10) Patent No.: US 11,833,716 B2
(45) Date of Patent: Dec. 5, 2023

(54) METHOD FOR CUSTOMIZED PRODUCTION OF ROOFING DETAIL PARTS

(71) Applicant: SIKA TECHNOLOGY AG, Baar (CH)

(72) Inventors: Roy Z'rotz, Ebikon (CH); Simon Schoenbrodt, Sarnen (CH); Herbert Ackermann, Tann (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 17/522,153

(22) Filed: Nov. 9, 2021

(65) Prior Publication Data

US 2022/0143902 A1   May 12, 2022

(30) Foreign Application Priority Data

Nov. 10, 2020 (EP) ..................... 20206816

(51) Int. Cl.
| | |
|---|---|
| *B29C 64/118* | (2017.01) |
| *B29C 64/393* | (2017.01) |
| *B33Y 50/02* | (2015.01) |
| *B29L 31/10* | (2006.01) |

(52) U.S. Cl.
CPC .......... *B29C 64/118* (2017.08); *B29C 64/393* (2017.08); *B29L 2031/108* (2013.01); *B33Y 50/02* (2014.12)

(58) Field of Classification Search
CPC ......... B29C 64/118; B29C 64/386–393; B32B 1/001
See application file for complete search history.

(56) References Cited

U.S. PATENT DOCUMENTS

| | | | | |
|---|---|---|---|---|
| 2014/0232035 | A1* | 8/2014 | Bheda | B29C 64/118 |
| | | | | 425/375 |
| 2017/0008233 | A1* | 1/2017 | Vontorcik, Jr. | C08G 18/42 |
| 2017/0333980 | A1 | 11/2017 | Yang et al. | |
| 2019/0126557 | A1* | 5/2019 | Flitsch | B29C 64/118 |
| 2020/0307096 | A1* | 10/2020 | Simonin | B29C 73/24 |
| 2022/0072763 | A1* | 3/2022 | Cordero | F24S 70/14 |

FOREIGN PATENT DOCUMENTS

| | | | |
|---|---|---|---|
| CN | 109057250 A | 12/2018 | |
| CN | 209780055 U | * 12/2019 | |
| EP | 2 588 021 A1 | 5/2013 | |
| FR | 3041736 A1 | * 3/2017 | B33Y 80/00 |
| FR | 3 052 381 A1 | 12/2017 | |
| WO | 2012/000511 A1 | 1/2012 | |

OTHER PUBLICATIONS

Lourchart Machine Translation (created Apr. 14, 2023) (Year: 2017).*
Mar. 24, 2021 Search Report issued in European Application No. 20 20 6816.

* cited by examiner

*Primary Examiner* — Matthew J Daniels
*Assistant Examiner* — Andrew L Swanson
(74) *Attorney, Agent, or Firm* — Oliff PLC

(57) ABSTRACT

A method for producing a roofing detail part for sealing a roof element, the method including the steps of: (a) providing and/or obtaining a digital model of a roof element to be sealed; and (b) based on the digital model, producing a roofing detail part fitting on the outer shape of the roof element by additive manufacturing.

14 Claims, 2 Drawing Sheets

METHOD FOR CUSTOMIZED PRODUCTION OF ROOFING DETAIL PARTS

TECHNICAL FIELD

The invention relates to a method for producing a roofing detail part for sealing a roof element and to a method for sealing a roof element.

BACKGROUND ART

Especially with flat roofs, it is highly important to seal the roof area as a pre-emptive measure to keep the roof weatherproof. Thereby, it is common to use prefabricated and customized roofing detail parts for specific roof elements or areas, such as e.g. penetrations, parapets, corners or ducts.

The customized roofing detail parts can for example be pre-shaped tubes, angled pieces, and the like. When they are connected in a watertight manner to the sealing material of the main area of the roof, e.g. membranes, the complete roof area can be sealed in a reliable and durable manner.

Due to different roof constructions, many specifically designed roofing detail parts are required. Therefore, either so called "generic shapes", which can be fit to several geometries are used, or custom-made parts specifically adapted for the individual situations have to be designed. Generic shapes have the drawback that they usually do not fit perfectly to the actual geometric situation and often need be stressed or bended, which constitutes a potential risk regarding water-tightness. Thus, much care has to be taken to properly install and fit these parts.

Custom-made parts, on the other hand, must be handcrafted which makes them very expensive. Another drawback is that handmade parts typically are welded together from elementary shapes what introduces the risk of additional weld lines as potential weak spots, in particular when considering the repeated seasonal heating-cooling cycles inducing thermal stresses.

As an alternative to prefabricated parts, so called "liquid applied coatings" can be used. However, the connection to the other sealing materials on the roof, e.g. membranes, constitutes a potential weak point regarding water-tightness because the application crucially depends on proper workmanship.

There is thus a need to provide improved solutions, which overcome the aforementioned drawbacks.

DISCLOSURE OF THE INVENTION

It is an object of the present invention to provide a method for providing customized roofing detailing parts which can be produced in a fast and cost efficient manner independently of the number of parts required.

Surprisingly, it has been found that these objects can be achieved by the features of claim 1. Thus, the core of the invention is a method for producing a roofing detail part for sealing a roof element, the method comprising the steps of:
a) Providing and/or obtaining a digital model of a roof element to be sealed;
b) Based on the digital model, producing a roofing detail part fitting on the outer shape of the roof element by additive manufacturing.

As it turned out, the combination of obtaining a digital model of the roof element to be sealed and additive manufacturing allows for producing roofing detail parts which perfectly fit the roof element and at the same time can be produced in a cost effective and efficient manner. Since the production is based on a digital model of the real roof element, every characteristic of the roof element will be taken into account in the roofing detail part.

Especially, with the inventive method even roofing detail parts with highly complex shapes can be produced in one piece. Since these roofing detail parts do not comprise weld lines or adhesively bonded sections, water-tightness is not an issue.

Overall, the inventive method offers an efficient way for producing individualized roofing detail parts. These parts can be produced just in time by anyone with basic technical expertise. Thus, no specialized technical education is required.

Furthermore, the production of the roofing detail parts by additive manufacturing allows for producing a single part at very low costs. Specifically, the costs per part are essentially independent on the lot size. Also, it can be ensured that the roofing detail parts provide the same quality as the one of membranes, which typically are used for sealing large roof areas.

Additional aspects of the invention are subject of further independent claims. Particularly preferred embodiments are outlined throughout the description and the dependent claims.

WAYS OF CARRYING OUT THE INVENTION

A first aspect of the present invention is directed to a method for producing a roofing detail part for sealing a roof element, the method comprising the steps of:
a) Providing and/or obtaining a digital model of a roof element to be sealed;
b) Based on the digital model, producing a roofing detail part fitting on the outer shape of the roof element by additive manufacturing.

Preferably, the roof element is a roof element of a building.

The term "additive manufacturing" refers to methods in which a three-dimensional object or a shaped body is produced by selective three-dimensional deposition, application and/or solidification of material. In this process, the deposition, application and/or solidification of the material takes place in particular based on a data model of the object to be produced, and in particular in layers. In the additive manufacturing method, each object is typically produced from one or a plurality of layers. Ordinarily, an object is manufactured using a shapeless material (e.g. liquids, powders, granules, pastes, etc.) and/or a shape-neutral material (e.g. bands, wires) that in particular is subjected to chemical and/or physical processes (e.g. melting, polymerization, sintering, curing or hardening).

Additive manufacturing methods are also referred to using terms such as "generative manufacturing methods", "additive manufacturing" or "3D printing". Compared to conventional technologies, which are based on object creation through either molding/casting or subtracting/machining material from a raw object, additive manufacturing or 3D printing technologies follow a fundamentally different approach for manufacturing. The processes used in additive manufacturing have their conceptual origin in inkjet printing technology, extended to the third dimension with other materials. It is possible to change the design for each object, without increasing the manufacturing costs, offering tailor made solutions for a broad range of products.

A "digital model" is meant to be a digital representation of a real object, i.e. a roof element, that exactly replicates the shape of the object. Typically, the digital model is stored in a computer readable data storage, especially in a data file. The data file format can e.g. be a computer-aided design (CAD) file format, a G-code (also called RS-274) file format and/or an Stl file format. Especially the digital model is a digital representation of at least the outer shape of the roof element.

Especially, the roof element is a roof curb, a roof drain, a roof edge, a roof expansion joint, a roof parapet wall, a roof penetration, a roof sleeper, a roof transition, a roof corner, a roof tie-in and/or a roof wall.

In particular, the roofing detail part is a cover, a hood, a cap or a revetment for a roof element, especially for a roof curb, a roof drain, a roof edge, a roof expansion joint, a roof parapet wall, a roof penetration, a roof sleeper, a roof transition, a roof corner, a roof tie-in and/or a roof wall.

In step b), a control system can be used to generate control data out of the digital model for controlling the additive manufacturing process. Such kind of control systems are known as such and are commercially available. The control system can be part of the additive manufacturing equipment, e.g. a 3D printer, or it can be part of a separate data processing unit, e.g. a computer system.

When producing the roofing detail part in step b) of the inventive method, the digital model is taken as base for producing the roofing detail part by additive manufacturing. Especially, the roofing detail part is produced with an inner shape corresponding to the negative shape of the digital model.

Especially, in step b), a further digital model of the roofing detail part to be produced is generated, whereby the further digital model is calculated based on the digital model of the roof element. The further digital model can e.g. be obtained by taking the outer surface of the digital model of the roof element and generating a surface with negative shape as the inner surface in the further digital model of the roofing detail part. An outer surface of the further model of the roofing detail part can e.g. be generated by adding a certain wall thickness to the regions behind the inner surface of the further digital model.

Preferably, in step a), the digital model of the roof element is obtained by 3D scanning of the roof element. 3D scanning is a process of analyzing a real-world object, e.g. a roof element, to collect data on its shape. The collected data can then be used to construct the digital model of the object. Thereby, a control system can be used to generate the digital model out of the collected data. The control system can be part of the 3D scanner or it can be part of a separate data processing unit, e.g. a computer system.

With 3D scanning, the real roof element can directly be scanned on top of the roof. This ensures that the digital model is an exact representation of the real roof element to be sealed. Overall, the combination of 3D scanning and additive manufacturing, especially with a 3D printer, offers an efficient way for producing individualized roofing detail parts with high precision.

However, in principle, it is also possible to obtain the digital model by measuring all of the lengths and angles of the roof element by hand and generating the digital model manually in a modelling software. Nevertheless, this is time consuming and more error-prone.

There are many different 3D scanners available on the market, which can be used for 3D scanning. Preferably, the scanning of the roof element is performed with a handheld and/or portable 3D scanner. Handheld and/or portable 3D scanners do not need a complicated installation and allow for a quick and easy scanning of the roof element to be sealed.

Preferably, the 3D scanner is designed for capturing objects from 1 cm to 20 m, especially 20 cm to 10 m, in length.

Especially, the 3D scanner is a non-contact 3D scanner. Such kind of scanners emit some kind of radiation, e.g. light, ultrasound or x-rays, and detect its reflection or radiation passing through the object to be scanned in order to probe the object.

For example, the 3D scanner is a scanner of type "calibry 3d scanner" by the company Thor3d, Varshayskoe Sh. 33, Moscow, Russia.

Preferably, additive manufacturing is effected by 3D printing, especially by fused deposition modeling (FDM) or fused particle fabrication (FPF). FDM is a process that typically uses a continuous filament of a thermoplastic material. FPF is similar to FDM but it uses particles, such as granules, in stead of continuous filament as a feed material. FPF is also known as fused granular fabrication (FGF).

Thereby, the filament is fed through a moving, heated printer extruder head, and is deposited on the growing object. The printer extruder head is moved under computer control to define the printed shape. Usually the head moves in two dimensions to deposit one horizontal plane, or layer, at a time. The object and/or the printer extruder head is then moved vertically by a small amount to start a new layer.

There are many different 3D printer available on the market, which can be used in the inventive method.

Preferably, the roofing detail part is produced from a plastic material, especially from a thermoplastic material. Especially, a melting point of the plastic material is between 120° C. and 300° C., preferably between 140° C. and 250° C.

In particular, the plastic material is chosen from thermoplastic polyolefins (TPO), polyvinylchloride (PVC) and/or keton ethylene ester (KEE).

These materials may be formulated with antioxidants, fillers, pigments, reinforcing materials and/or further thermoplastic polymers. Reinforcing materials may be chosen from fibers, e.g. carbon fibers, polyethylene fibers and/or glass fibers. The further thermoplastic polymers preferably have a melting point between 50° C. and 300° C., preferably between 80° C. and 250° C.

Roofing detail parts of plastic materials, especially thermoplastic materials, are best compatible with usual sealing materials for roofs, such as e.g. membranes. Specifically, roofing detail parts made from thermoplastic materials can easily be welded with thermoplastic membranes in order to achieve a watertight connection.

Especially, the roofing detail part is produced with a single ply structure. Such structures are physically stable and can be produced in a reliable manner with additive manufacturing.

Most preferred, the roofing detail part is a monolithic part. With monolithic parts, there is no risk of leakage caused by weld lines or the like. Thus, a monolithic part is much more reliable than a part consisting of several interconnected sections.

In particular, a wall thickness of the roofing detail part produced is from 0.1-10 mm, especially 1-5 mm. Such parts tuned out to be physically stable and watertight while still being flexible enough for installation. However, for specific applications, roofing detail parts with other wall thicknesses may be suitable as well.

A further aspect of the present invention is related to a method for sealing a roof element comprising the following steps:

(i) Performing the inventive method as described above in order to obtain a roofing detail part fitting on the roof element;
(ii) Installing the roofing detail part on the roof element;
(iii) Optionally, connecting the installed roofing detail part with a further sealing element on the roof, especially by heat welding.

In step (iii), the further sealing element can e.g. be another roofing detail part and/or a sealing material of the main area of the roof, e.g. a membrane and/or a waterproofing sheet.

With this method, the whole roof area can be sealed with sealing materials and roofing detail parts, which are interconnected in a watertight manner.

Preferably, the material of the roofing detail part is chosen such that it is heat weldable to the further sealing element. Especially, both, the roofing detail part and the further sealing element are made from a thermoplastic material, preferably a material as described above.

However, other combinations might be suitable as well for special applications. Instead for or in addition to heat welding, another method of joining might be used, e.g. bonding with an adhesive and/or clamping.

Further advantageous configurations of the invention are evident from the exemplary embodiments.

BRIEF DESCRIPTION OF FIGURES

The drawings used to explain the embodiments show.

In the figures, the same components are given the same reference symbols.

Exemplary Embodiments

Figure 1:
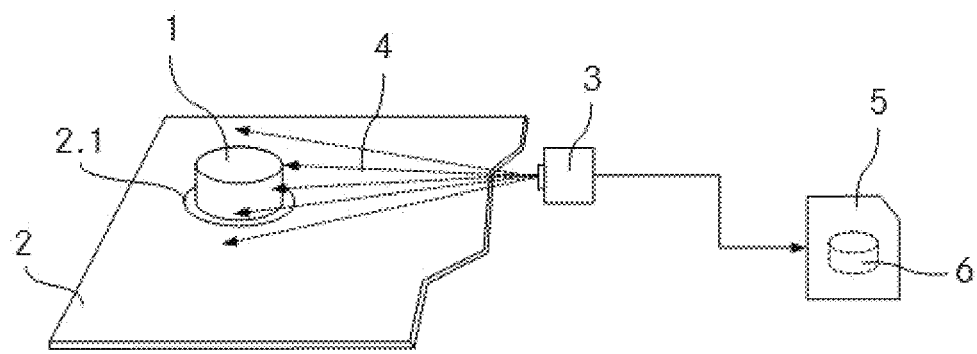
FIG. 1 A schematic representation of a section of a flat roof with a duct extending through a membrane whereby the duct is scanned with a 3D scanner for obtaining a digital model of the duct.

On the left side of FIG. 1, a section of a flat roof is shown. Specifically, a thermoplastic membrane 2 is arranged on the top of the flat roof with a roof element in the form of a cylindrical duct 1 extending in vertical direction. In the situation of FIG. 1, the duct 1 extends through a circular opening 2.1 in the membrane 2.

With the help of a portable 3D scanner 3, the duct 1 is scanned with laser light 4 in order to collect data on the shape of the duct 1. The data collected is processed within the control unit of the scanner 3 and stored in a data file 5 as a digital model 6 of the duct 1. For example, the file format of the data file 5 is a CAD file format.

Figure 2:
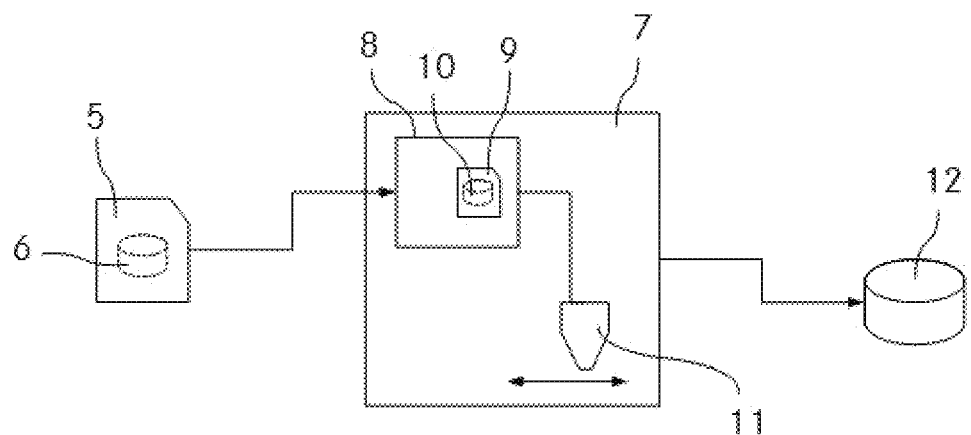
FIG. 2 A schematic representation of a 3D printing process of a roofing detail part, which is based on the digital model of FIG. 1.

As shown in FIG. 2 the data file 5 comprising the digital model 6 of the duct 1 is transmitted to a 3D printer 7. Within the control unit 8 of the 3D printer 7, a further digital model 10 of a roofing detail part fitting on duct 1 is generated based on the digital model 6 of the duct 1 and stored in a further data file 9. Thereby, the negative shape of the outer surface of the digital model 6 of the duct 1 corresponds to the inner surface of the further digital model 10 of the roofing detail part.

Based on the further digital model 10, the control unit 8 of the 3D printer 7 produces control data for the print head 11 producing the roofing detail part 12 fitting on duct 1. The material used for printing is a thermoplastic polymer with a melting point of for example 160°. As seen on the right side of FIG. 2, the roofing detail part 12 is a monolithic hollow cylindrical body which is closed on the upper end and open in the lower end.

Figure 3:
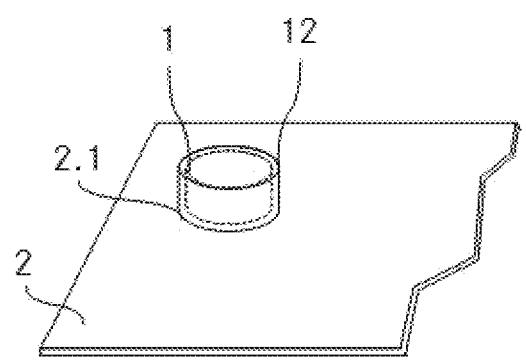
FIG. 3 A schematic representation of the flat roof section of FIG. 1 after the roofing detail part of FIG. 2 has been installed on the duct and the roofing detail part has been heat welded with the membrane in order to produce a watertight connection.

Once the roofing detail part 12 is ready, it can be installed on the duct 1 as shown in FIG. 3. Thereby, the roofing detail part 12 is connected to the membrane 2 in the region of the opening 2.1 by heat welding all around in order to provide a watertight connection between roofing detail part 12 and membrane 2.

Figure 4:
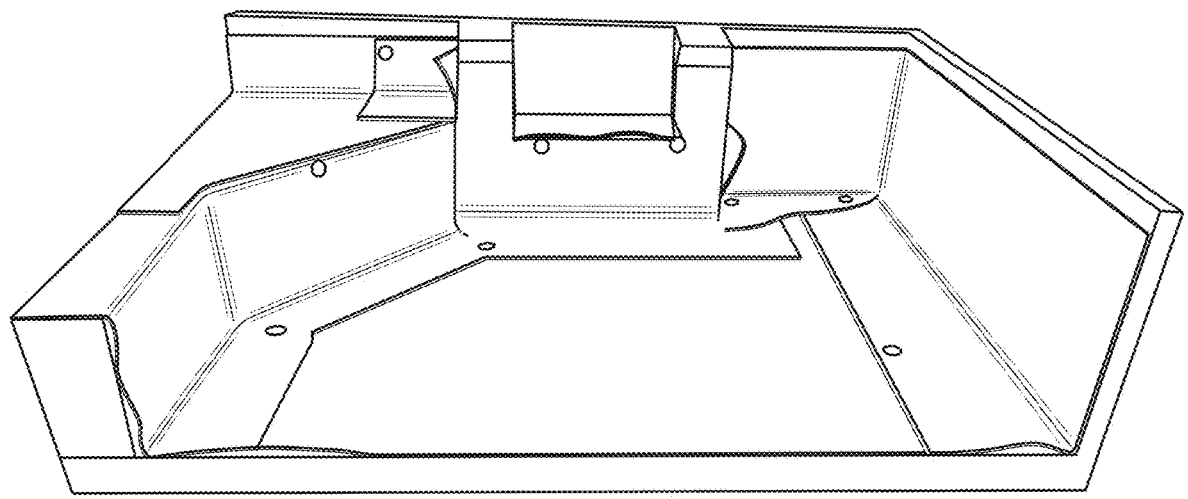
FIG. 4 A prior art approach for sealing a model of a complex shaped corner of a flat roof with many small pieces of roofing membrane.

FIG. 4 shows a prior art approach for sealing a model of a complex shaped corner of a flat roof. Thereby, the corner is covered with several small pieces of roofing membrane, which are to be connected by heat welding. Thus this approach results in a "patchy" cover with several weak spots (welding lines) regarding water tightness.

Figure 5:
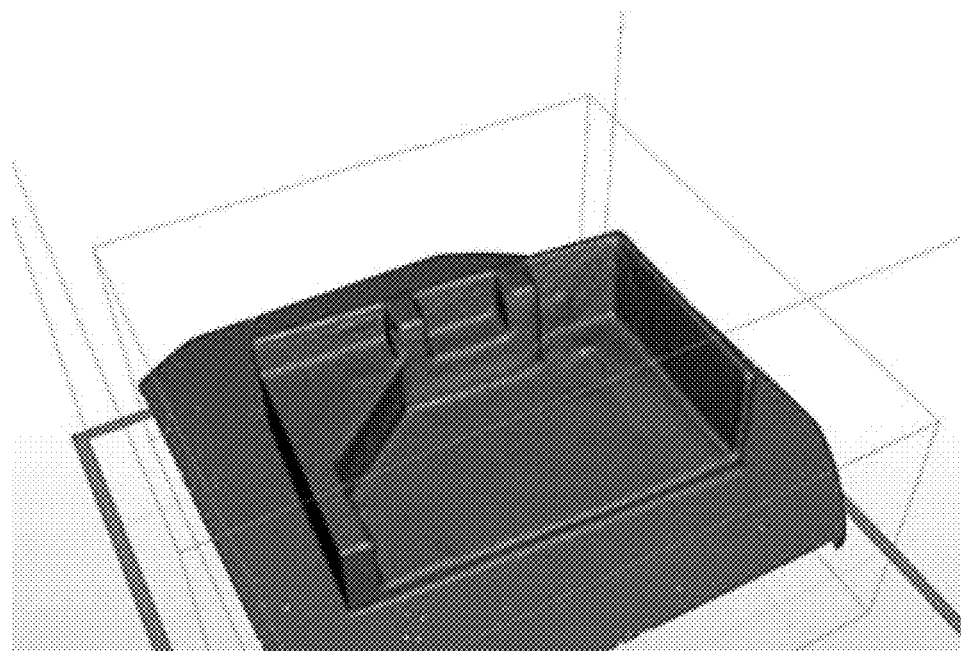
FIG. 5 A 3D scan of the model corner of FIG. 4.

FIG. 5 shows a 3D scan of the model corner of FIG. 4. Similar to the procedure shown in FIG. 1-3, the data collected is used to put together a digital model of the corner, which is then fed into a 3D printing system, which utilizes a suitable thermoplastic compound to produce a monolithic detailing part.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. A method for producing a roofing detail part for sealing a roof element, the method comprising the steps of:
    (a) providing and obtaining a digital model of a roof element to be sealed, the digital model being obtained by 3D scanning of the roof element and having an outer shape defined by an outer surface;
    (b) based on the digital model, producing a roofing detail part fitting on the outer shape of the roof element by additive manufacturing, the roofing detail part having inner shape defined by an inner surface,
    wherein the roofing detail part is produced such that the inner shape corresponds to the outer shape of the digital model,
    the roof element is selected from the group consisting of a roof curb, a roof drain, a roof edge, a roof expansion joint, a roof parapet wall, a roof penetration, a roof sleeper, a roof transition, a roof corner, a roof tie-in, and a roof wall, and
    the roofing detail part is a cover, a hood, a cap, or a revetment for the roof element.

2. The method according to claim 1, wherein the scanning of the roof element is performed with at least one of a handheld 3D scanner and a portable 3D scanner.

3. The method according to claim 1, wherein the additive manufacturing includes 3D printing.

4. The method according to claim 1, wherein the roofing detail part is produced from a plastic material.

5. The method according to claim 4, wherein the plastic material comprises at least one selected from the group consisting of antioxidants, fillers, pigments, reinforcing materials, and thermoplastic polymers.

6. The method according to claim 1, wherein the roofing detail part is produced with a single ply structure.

7. The method according to claim 1, wherein a wall thickness of the roofing detail part produced is from 0.1-10 mm.

8. The method according to claim 1, wherein the production of the roofing detail part is effected such that an outer surface of the roofing detail part is similar to the outer surface of the roof element.

9. The method according to claim 1, wherein step b) includes, based on the digital model of the roof element, generating a further digital model of the roofing detail part to be produced.

10. The method for sealing a roof element comprising the following steps:
   (i) performing the method according to claim 1 in order to obtain a roofing detail part fitting on the roof element; and
   (ii) installing the roofing detail part on the roof element.

11. The method according to claim 3, wherein the 3D printing includes fused deposition modeling or fused particle fabrication.

12. The method according to claim 4, wherein the plastics material is a thermoplastic material.

13. The method according to claim 12, wherein the thermoplastic material is selected from the group consisting of thermoplastic polyolefins, polyvinylchloride, and ketone ethylene ester.

14. The method according to claim 10, further comprising connecting the installed roofing detail part with a further sealing element on the roof by heat welding.

\* \* \* \* \*